Patented May 11, 1926.

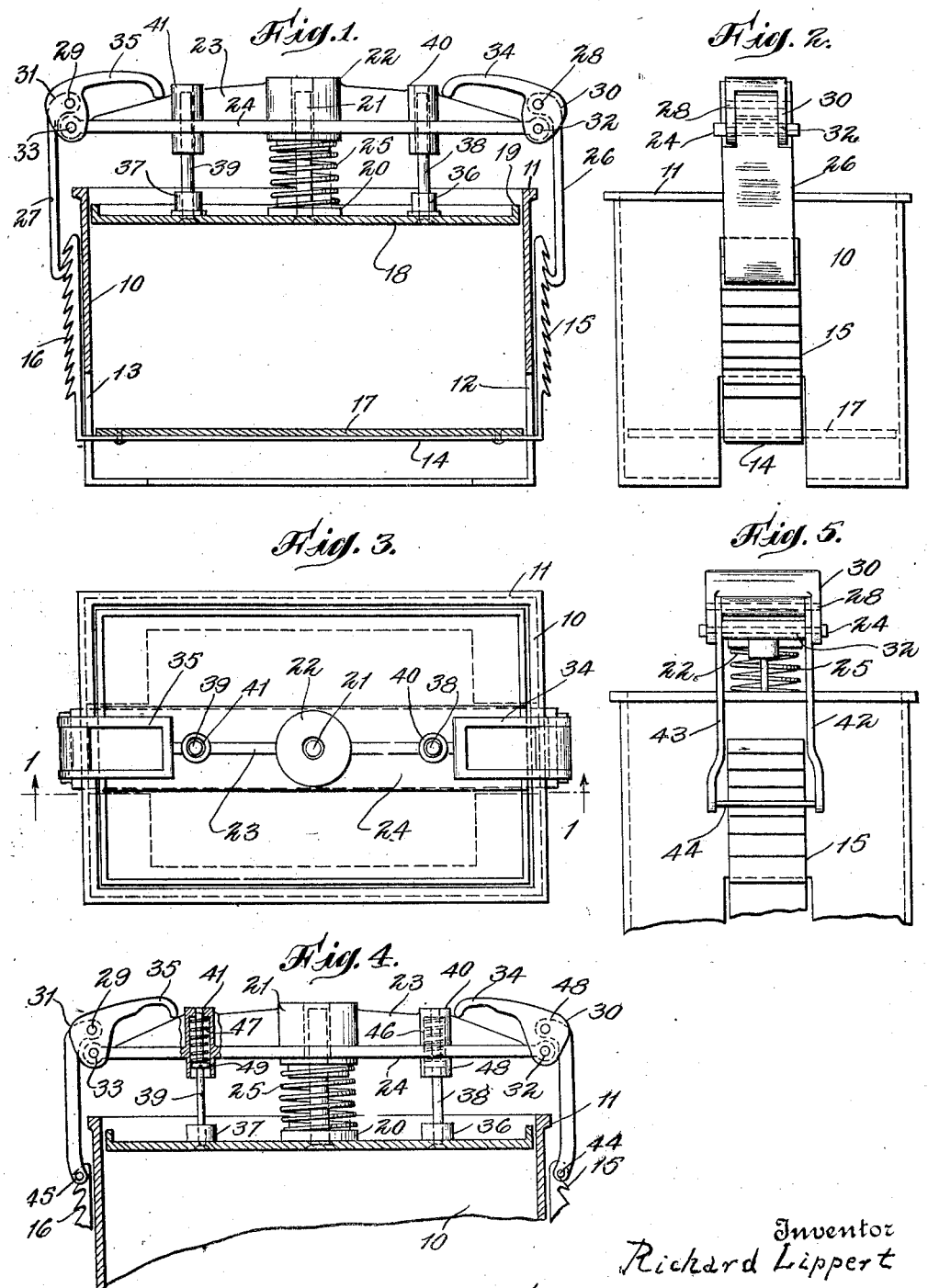

1,584,461

UNITED STATES PATENT OFFICE.

RICHARD LIPPERT, OF NEW YORK, N. Y.

MEAT BOILER.

Application filed December 12, 1925. Serial No. 75,053.

The present invention relates to improvements in meat boilers, particularly ham and corned beef boilers and presses as they are described and shown for instance in my Patents No. 1,539,680, dated May 26, 1925 and No. 1,560,066, dated November 3, 1925 respectively and it is the principal object of the invention to provide a boiler of this type having a movable bottom plate with means to subject the meat to uniform pressure from the top as well as from the bottom, and consequently to obtain meat of perfectly uniform consistence and not apt to crumble under the knife.

Another object of the invention is the provision of a meat boiler having its cover provided with means for exerting an upwardly directed pull on the bottom plate while simultaneously maintaining the cover under a suitable downwardly directed pressure.

A further object of the invention is the provision of an improved meat boiler and presser equipped with suitable cushioning means for the movements of the cover plate thereof.

A still further object of the invention is the provision of a meat boiler having a comparatively simple and inexpensive construction and one relieved of cumbersome outward extensions liable to break off and to accumulate dirt and grease thus making the boiler sanitary and durable without however interfering with its positive and effective operation.

These and other objects and advantages of my invention will become more fully apparent as the description thereof proceeds, and will then be more specifically defined in the appended claims.

In the accompanying drawing forming a material part of this disclosure:

Fig. 1 is a front elevation of a meat boiler constructed according to my invention partly in section on line 1—1 of Figure 2.

Fig. 2 is an end view thereof.

Fig. 3 is a top plan view of the boiler, Figure 1.

Fig. 4 is a fragmentary sectional front elevation of a modified form of boiler, and Fig. 5 is an end view thereof.

The boiler illustrated in Figures 1, 2 and 3 comprises a container 10, preferably made of suitable stainless metal having an upper marginal flange 11, and end walls in which longitudinal slots 12 and 13 are provided allowing the upward displacement of a band 14 which has its ends extending out of the container 10, bent upwardly, and equipped with downwardly slanting teeth 15 and 16 respectively.

To the upper face of band 14 is secured within container 10, a movable false bottom plate 17 arranged near the bottom of said container and spaced therefrom.

Within the boiler or container 10, in the upper part thereof a movable plate 18 is arranged, having an upstanding marginal flange 19.

Within the depression formed by said flange, in approximately the center of plate 18, a foot plate or base 20 is secured to or made integrally with the plate from which a pin 21 extends vertically into a suitable socket 22 formed within a strengthening rib 23 made in one piece with and on top of an operating plate 24 to slide in said socket, and eventually to extend through the open top thereof.

A strong spiral spring 25 resting with its lower end on the base 20 and engaging with its upper end the lower face of socket part 22 is wound about said pin 21 between base and socket, and has the tendency to normally press the movable plate 18 against the meat, while during the tensioning of said spring, when hooks 26 and 27 are brought into engagement with the racks 15 and 16 respectively the spring will have the tendency to raise the plate 18 and to draw the same upwardly against plate 27, in order to allow a slight yielding of the meat during the boiling process.

The hooks 26 and 27 are pivotally attached, as at 28 and 29 to levers 30 and 31, eccentrically and pivotally attached as at 32, 33 with their bodied end plate to the ends of the plate 24. The levers 30 and 31 have operating fingers or handles 34, 35 normally resting with their ends on top of rib 23, while the bodies of said levers are so constructed that the downward swinging of the handles about the pivot points of the levers will, effectively lock the hooks and racks and hold the bottom plate 17 in its respective adjusted position.

The plate 18 carries to both sides of base 20, sockets 36, 37 which may be cylindrical as shown, or square, or thereon suitably shaped and in which are secured the lower ends of the pins 38, 39 respectively, the upper ends of which are engaged in similar sockets 40, 41 formed with the plate 24 and rib 23 to slide therein and to project eventually through the open tops of said sockets 40, 41.

The device operates as follows: The boned and defatted meat, as for instance ham or corned beef, is placed into container 10 above plate 17 and below plate 18. The eccentric levers are then swung around their pivot points to engage the hooks 26 and 27 with the racks 15 and 16 which will carry the bottom upwardly and simultaneously depress the plate 18 against the upper part of the meat within the container, while the pins 38 and 39 glide within the sockets 40 and 41, and if the eccentric levers are then swung about their pins or pivots so that the handles 34, 35 assume their lowest lateral positions, the ham and meat will be held under a uniform pressure throughout within the container, and will then be subjected to boiling in the ordinary well known manner.

It will be clear that during the closing of the container in the above described manner the spring 25 will be tensioned, and the sockets 40, 41 will eventually engage sockets 30, 37 so that a uniform pressure will be exerted on all parts of the cover and ham.

The modified form of my invention illustrated in Figures 4 and 5, is substantially constructed in the same way as the preferred form with the exception of the construction of the hooks 26 and 27, which are here formed with two lateral shanks 42, 43 having two outwardly curved lower ends connected by pins 44, 45 adapted to engage under the downwardly directed teeth of the racks 15 and 16 respectively.

Furthermore, the pins 38 and 39 are surrounded within the sockets 40 and 41 by spiral springs 46, 47 cushioning the movements of said pins which carry collars 48, 49 upon which the lower ends of springs 46, 47 rest, while their upper ends engage the lower face of the top plate of said sockets. This form of my invention is preferably used if large pieces of meat such as for instance corned beef, are to be pressed and boiled within the container.

The operation of the modified form is otherwise substantially the same as that of the preferred form.

It will be evident that the boiler may be made in any desired size to suit the various sizes of hams, etc. and of suitable material ensuring sanitary operation and allowing a casting, and it is to be understood that the apparatus is subject to many changes in its general arrangement and construction of its minor details, such as fall within the scope of the appended claims, without departure from the spirit of the invention described.

Having thus described my invention, what I claim as new and desire to secure by Letters Patent is:

1. In a ham boiler, the combination of an upper movable plate with a lower movable plate, a means formed with said bottom plate allowing an upward pulling of said bottom plate towards said top plate, and a means engaging said first named means and cooperating with said upper movable plate for simultaneously moving both plates together for producing a ham of uniform consistence.

2. In a ham boiler, the combination of an upper movable plate with a lower movable plate, a means secured to said bottom plate allowing an upward pulling of said bottom plate towards said top plate, an operating plate, levers eccentrically and pivotally attached to the ends of said operating plate, and hooks pivotally attached to said levers adapted to engage said first named means for producing a simultaneous compression movement of both movable plates for giving to the ham a uniform consistence.

Signed at New York in the county of New York and State of New York this 7th day of December A. D. 1925.

RICHARD LIPPERT.